(12) United States Patent
Park

(10) Patent No.: US 12,738,606 B2
(45) Date of Patent: Sep. 15, 2026

(54) BATTERY

(71) Applicant: Samsung SDI Co., Ltd., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 952 days.

(21) Appl. No.: 17/658,970

(22) Filed: Apr. 12, 2022

(65) Prior Publication Data

US 2022/0328937 A1 Oct. 13, 2022

(30) Foreign Application Priority Data

Apr. 13, 2021 (KR) ........................ 10-2021-0048019

(51) Int. Cl.
*H01M 50/533* (2021.01)

(52) U.S. Cl.
CPC ................................ *H01M 50/533* (2021.01)

(58) Field of Classification Search
None
See application file for complete search history.

(56) References Cited

U.S. PATENT DOCUMENTS 11,063,311 B2 7/2021 Takeuchi
2009/0123830 A1* 5/2009 Kato .................. H01M 50/522 429/160
2011/0003181 A1 1/2011 Lee et al.
2016/0372722 A1* 12/2016 Yoshida .............. H01M 50/528
2019/0097190 A1 3/2019 Seol et al.
2020/0152923 A1* 5/2020 Takeuchi ............... B23K 26/21
2020/0194768 A1* 6/2020 Choi ................... H01M 50/548
2020/0212409 A1 7/2020 Bantel et al.
2020/0388813 A1 12/2020 Yamamoto
2021/0143515 A1* 5/2021 Ober ................... H01M 50/505
2021/0151837 A1* 5/2021 Shimizu .............. H01M 50/533
2022/0311102 A1* 9/2022 Cournoyer ........... B23K 31/125

FOREIGN PATENT DOCUMENTS

CN 109546024 A 3/2019
CN 110235278 A 9/2019
EP 3 657 572 A1 5/2020
JP H10-125357 A 5/1998
JP 2002324584 A * 11/2002 ........... H01M 10/05

(Continued)

OTHER PUBLICATIONS

Chinese Office Action for CN Patent Application No. 202210386330.3, dated Aug. 27, 2024, 8 pages.

(Continued)

*Primary Examiner* — Scott J. Chmielecki
(74) *Attorney, Agent, or Firm* — Womble Bond Dickinson (US) LLP

(57) ABSTRACT

A battery includes: a cell having a first surface and a second surface opposite to each other along a first axis; and a first electrode tab on the first surface of the cell. The first electrode tab includes: a first coupling piece including a first coupling portion coupled to the first surface of the cell; and a first lead-out piece extending from the first coupling piece outside a periphery of the cell along a second axis. The first coupling portion has a convex arc shape toward the first lead-out piece.

19 Claims, 10 Drawing Sheets

(56) References Cited

FOREIGN PATENT DOCUMENTS

| | | | | | |
|---|---|---|---|---|---|
| JP | 3895876 | B2 | | 12/2006 | |
| JP | 3231495 | U | * | 4/2021 | ........ H01M 10/0525 |
| KR | 10-1057541 | B1 | | 8/2011 | |
| KR | 10-2020-0019880 | A | | 2/2020 | |
| WO | WO-2019017410 | A1 | * | 1/2019 | ............. B23K 26/21 |

OTHER PUBLICATIONS

EPO Extended Search Report dated Sep. 19, 2022 issued in corresponding EP Patent Application No. 22168145.5, 9 pages.

European Office Action for EP Application 22168145.5, dated Feb. 12, 2025, 4 pages.

Korean Office Action for KR Application 10-2021-0048019, dated Jan. 23, 2025, 7 pages.

Chinese Office Action dated Dec. 25, 2023, issued in corresponding Chinese Patent Application No. 202210386330.3, 18 pages with English Translation.

* cited by examiner

BATTERY

CROSS-REFERENCE TO RELATED APPLICATION

This application claims priority to and the benefit of Korean Patent Application No. 10-2021-0048019, filed on Apr. 13, 2021, in the Korean Intellectual Property Office, the disclosure of which is incorporated by reference herein in its entirety.

BACKGROUND

1. Field

Aspects of embodiments of the present disclosure relate to a battery.

2. Description of the Related Art

Generally, secondary batteries are designed to be charged and discharged, unlike primary batteries that are not designed to be charged. Secondary batteries are used as energy sources for mobile devices, electric vehicles, hybrid vehicles, electric bicycles, uninterruptible power supplies, and so on and are used in the form of a single battery or in the form of a module in which multiple batteries are connected to each other and bundled together as a unit depending on the type of external device(s) to which it is to be applied.

SUMMARY

One or more embodiments of the present disclosure include a battery in which an electrode tab connected to an electrode of a cell has improved impact resistance characteristics.

Additional aspects and features of the present disclosure will be set forth, in part, in the description which follows and, in part, will be apparent from the description or may be learned by the practice of the described embodiments of the present disclosure.

According to an embodiment of the present disclosure, a battery includes: a cell having a first surface and a second surface opposite to each other along a first axis; and a first electrode tab on the first surface of the cell. The first electrode tab includes: a first coupling piece including a first coupling portion coupled to the first surface of the cell; and a first lead-out piece extending from the first coupling piece outside a periphery of the cell along a second axis. The first coupling portion has a convex arc shape toward the first lead-out piece.

The first coupling portion may have an open arc shape.

A width of the first coupling piece may be greater than a width of the first lead-out piece along a third axis crossing the first and second axes.

A width, along the third axis, of the arc shape first coupling portion may be greater than a width of the first lead-out piece.

The first electrode tab may further include a first fixing piece extending from the first coupling piece along a third axis crossing the second axis.

The first fixing piece may be a pair at both sides of the first coupling piece along the third axis.

The first lead-out piece may extend in one direction of the second axis from the first coupling piece, and the first electrode tab may further include a first anti-rotation piece extending from the first coupling piece in a direction opposite to the one direction of the second axis.

The first lead-out piece and the first anti-rotation piece may respectively be at a front position and a rear position opposite to each other along the second axes with respect to the first coupling piece.

A position alignment surface may be on adjacent side surfaces of the first anti-rotation piece and the first fixing piece.

The first coupling portion may include: a main coupling portion having a convex arc shape toward the first lead-out piece; and an auxiliary coupling portion having a convex arc shape toward the first anti-rotation piece.

A length along the convex arc shape of the main coupling portion may be greater than a length along the convex arc shape of the auxiliary coupling portion.

The main coupling portion may have an arc shape with a first curvature, and the auxiliary coupling portion may have an arc shape with a second curvature that is different from the first curvature.

The first curvature of the main coupling portion may be less than the second curvature of the auxiliary coupling portion.

A width of the main coupling portion in a third axis crossing the first and second axes may be greater than a width of the first lead-out piece, and a width of the auxiliary coupling portion may be less than the width of the first lead-out piece.

The first lead-out piece, the first coupling piece, and the first anti-rotation piece, which may be sequentially arranged along the second axis, and a first fixing piece extending from the first coupling piece along a third axis crossing the first and second axes may have an overall cross shape.

With respect to the first lead-out piece, the first coupling piece, and the first anti-rotation piece, which may be sequentially arranged along the second axis, a width of the first coupling piece along the third axis may be greater than widths of the first lead-out piece and the first anti-rotation piece.

A width, along the third axis, of the arc shaped first coupling portion may be greater than the widths of the first lead-out piece and the first anti-rotation piece.

A first lead wire extending along a third axis crossing the second axis may be connected to the first lead-out piece.

The battery may further include a second electrode tab arranged on the second surface of the cell.

The second electrode tab may include: a second coupling piece including a second coupling portion coupled to the second surface of the cell; and a second lead-out piece extending from the second coupling piece to outside a periphery of the cell along the second axis. The second coupling portion may have a convex arc shape toward the second lead-out piece.

BRIEF DESCRIPTION OF THE DRAWINGS

The above and other aspects and features of embodiments of the present disclosure will be more apparent from the following description, taken in conjunction with the accompanying drawings, in which.

DETAILED DESCRIPTION

Figure 1:
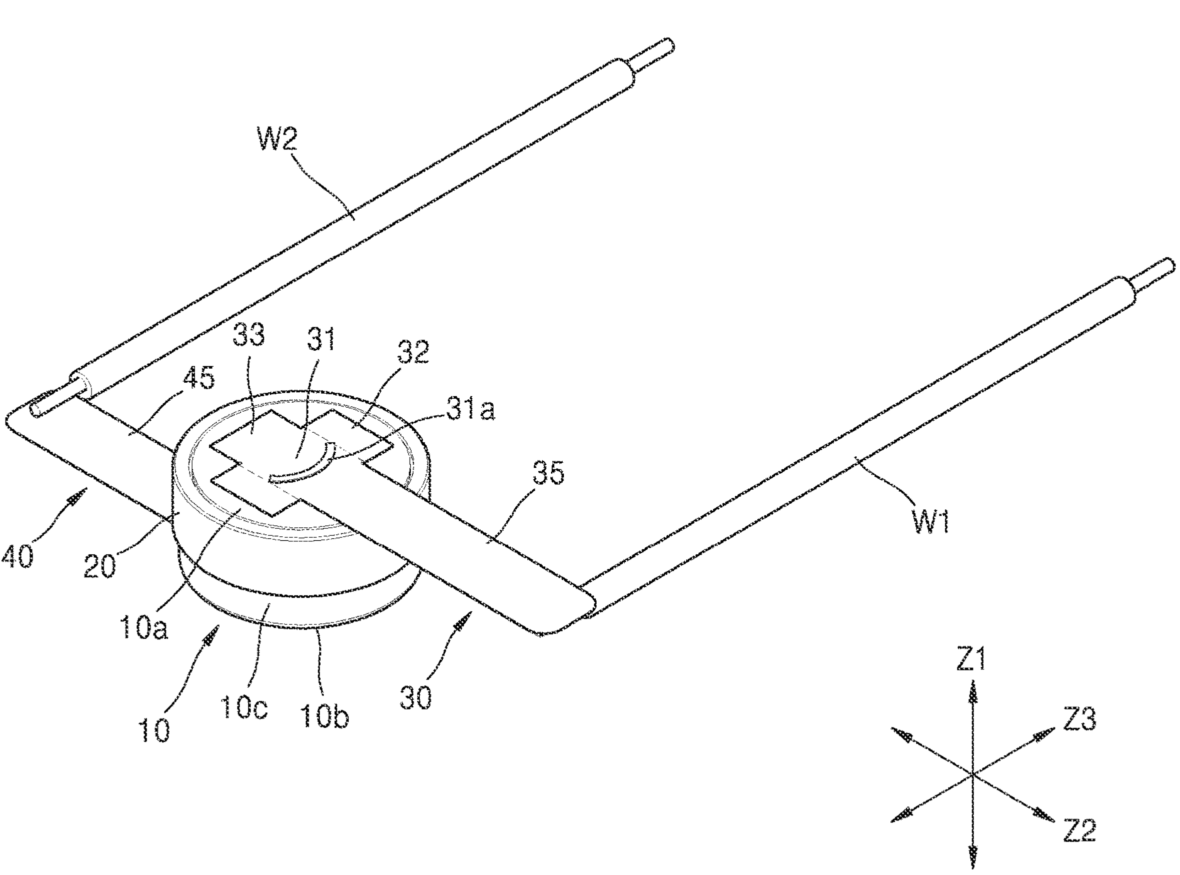
FIG. 1 is a perspective view of a battery according to an embodiment of the present disclosure.

Reference will now be made, in detail, to embodiments, examples of which are illustrated in the accompanying drawings. Like reference numerals refer to like elements throughout. The described embodiments may have different forms and should not be construed as being limited to the descriptions set forth herein. Accordingly, the embodiments are merely described below, by referring to the figures, to explain aspects and features of the present description. As used herein, the term "and/or" includes any and all combinations of one or more of the associated listed items. Expressions, such as "at least one of," when preceding a list of elements, modify the entire list of elements and do not modify the individual elements of the list. Further, the use of "may" when describing embodiments of the present disclosure relates to "one or more embodiments of the present disclosure." As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a battery according to embodiments of the present disclosure will be described with reference to the accompanying drawings.

Figure 2:
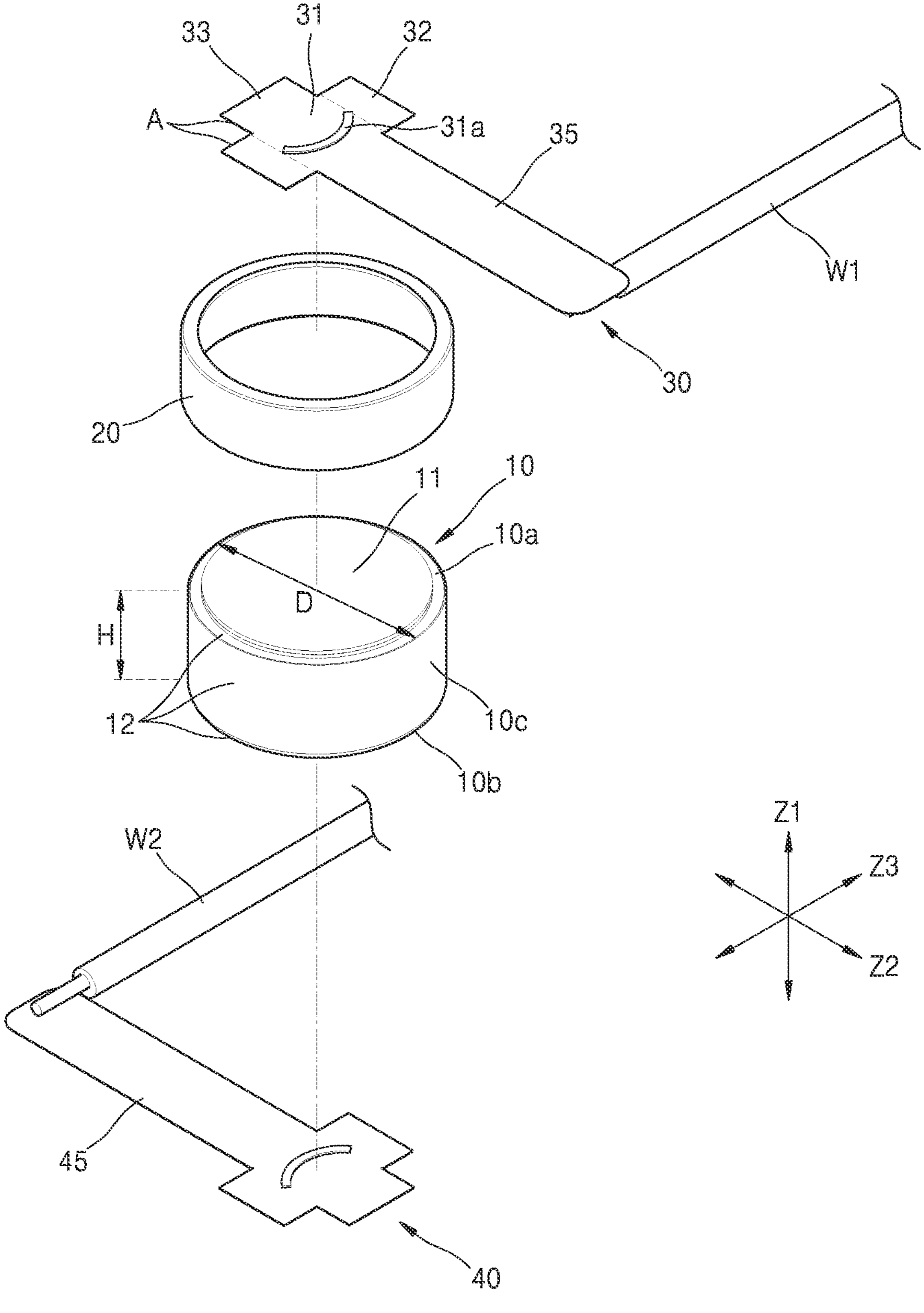
FIG. 2 is an exploded perspective view of the battery shown in FIG. 1.
Figure 3:
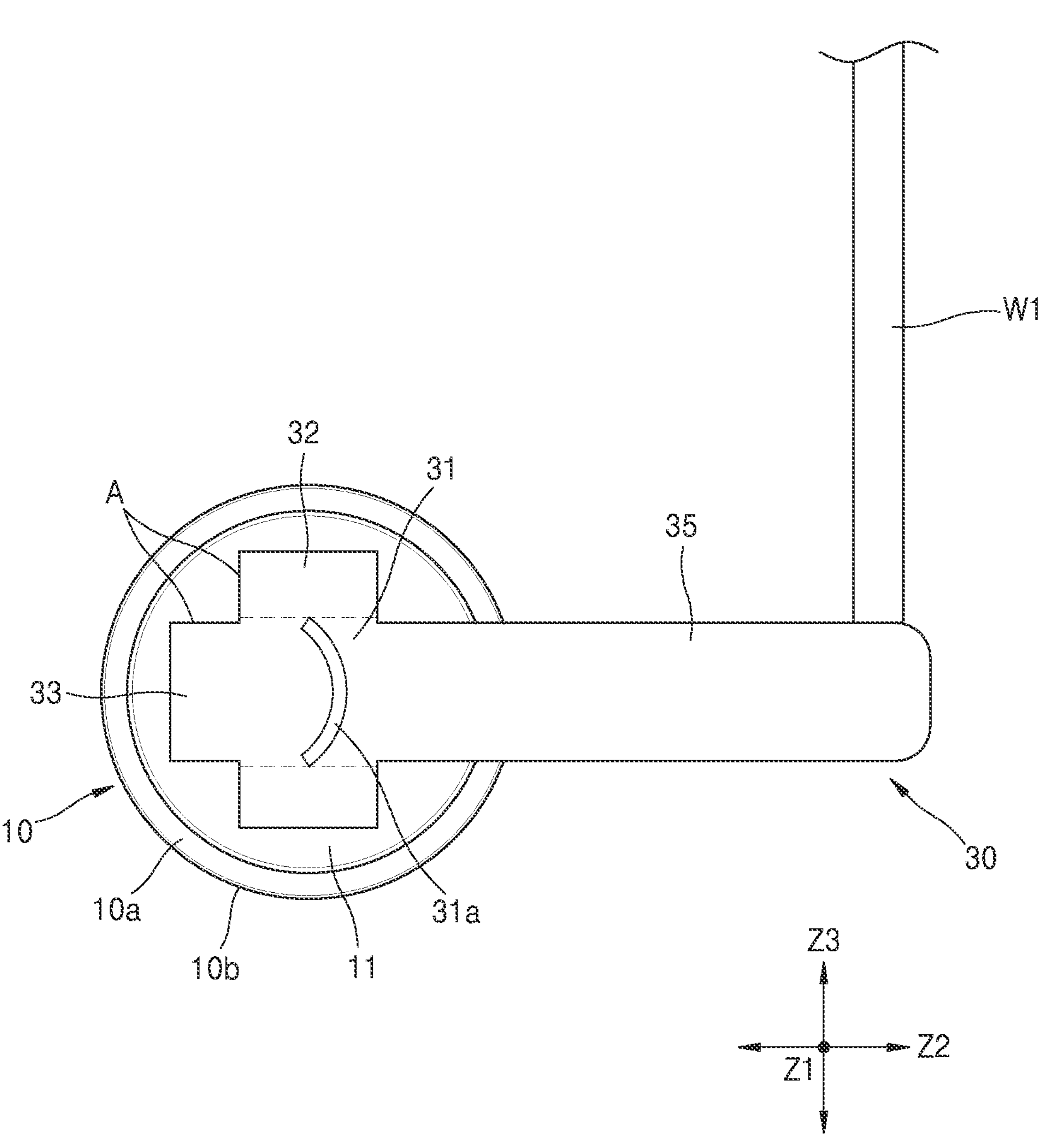
FIG. 3 is a view illustrating a first side of the battery shown in FIG. 1.
Figure 4:
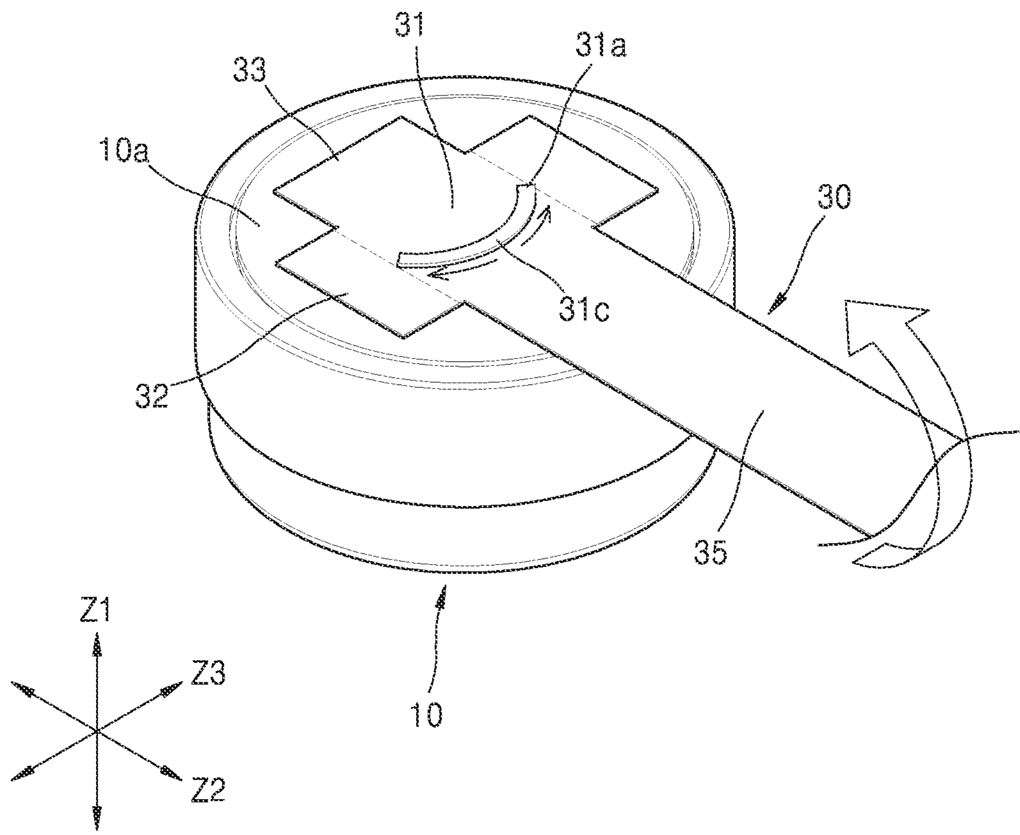
FIG. 4 is a perspective view illustrating a stress state acting on a first coupling portion of the battery shown in FIG. 1.
Figure 5:
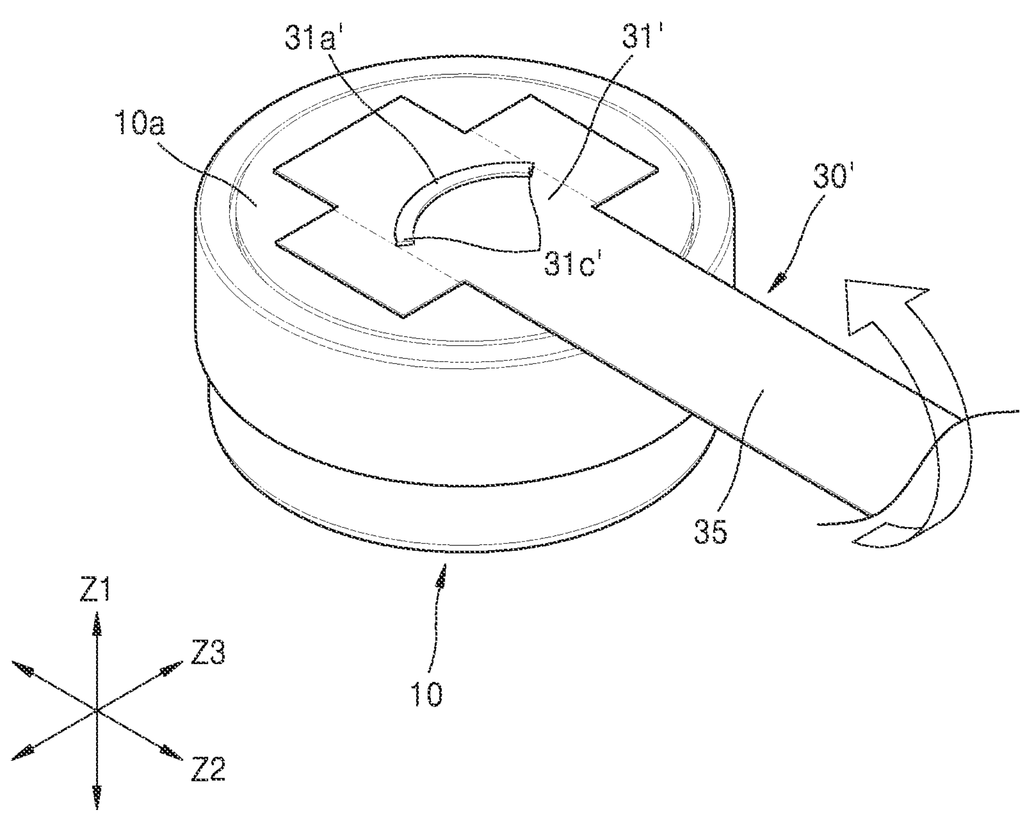
FIGS. 5 and 6 are perspective views illustrating a stress state acting on a first coupling portion in comparative examples.
Figure 6:
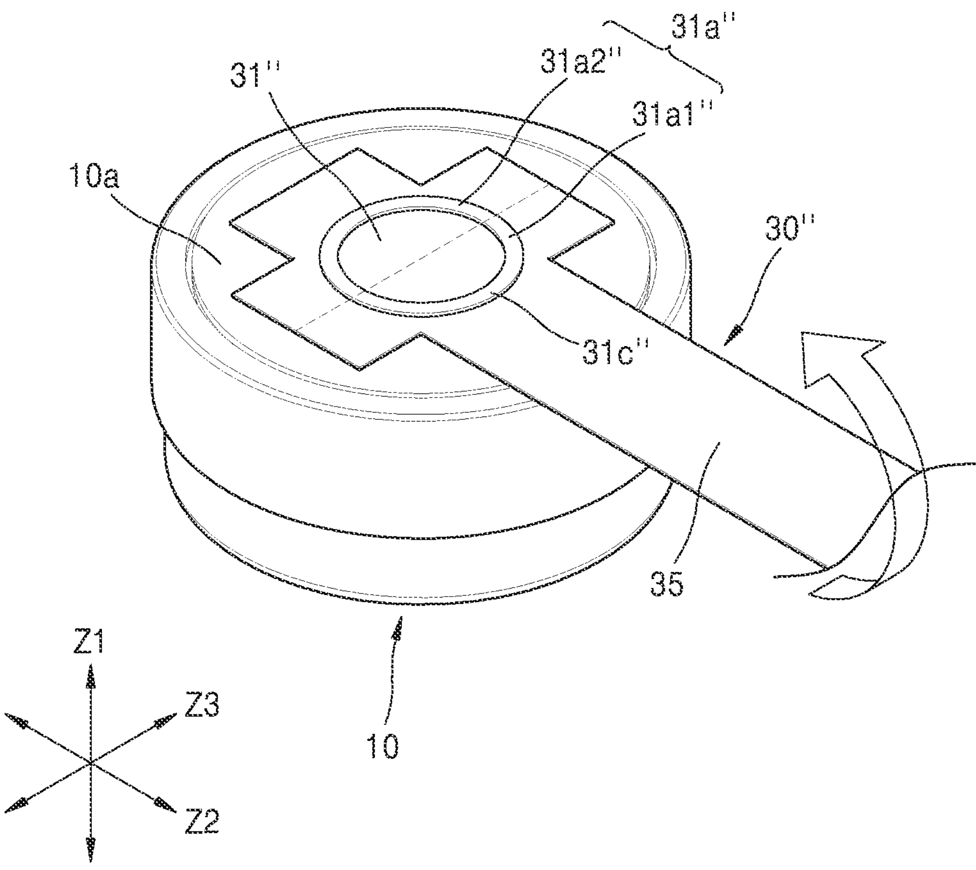
Figure 7:
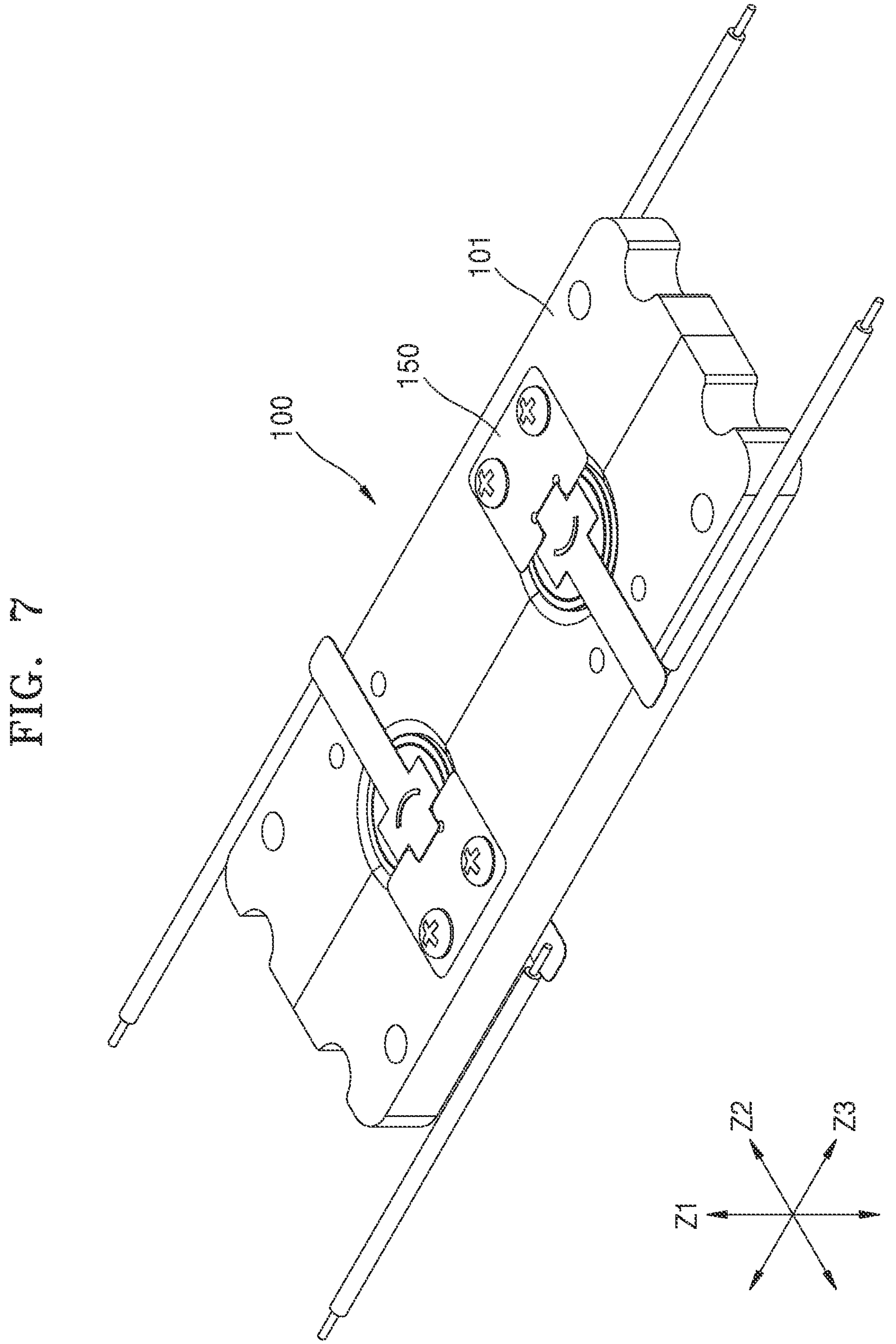
FIGS. 7 and 8 are views illustrating temporary fixing of a first electrode tab when a first coupling portion of the battery shown in FIG. 1 is formed.
Figure 8:
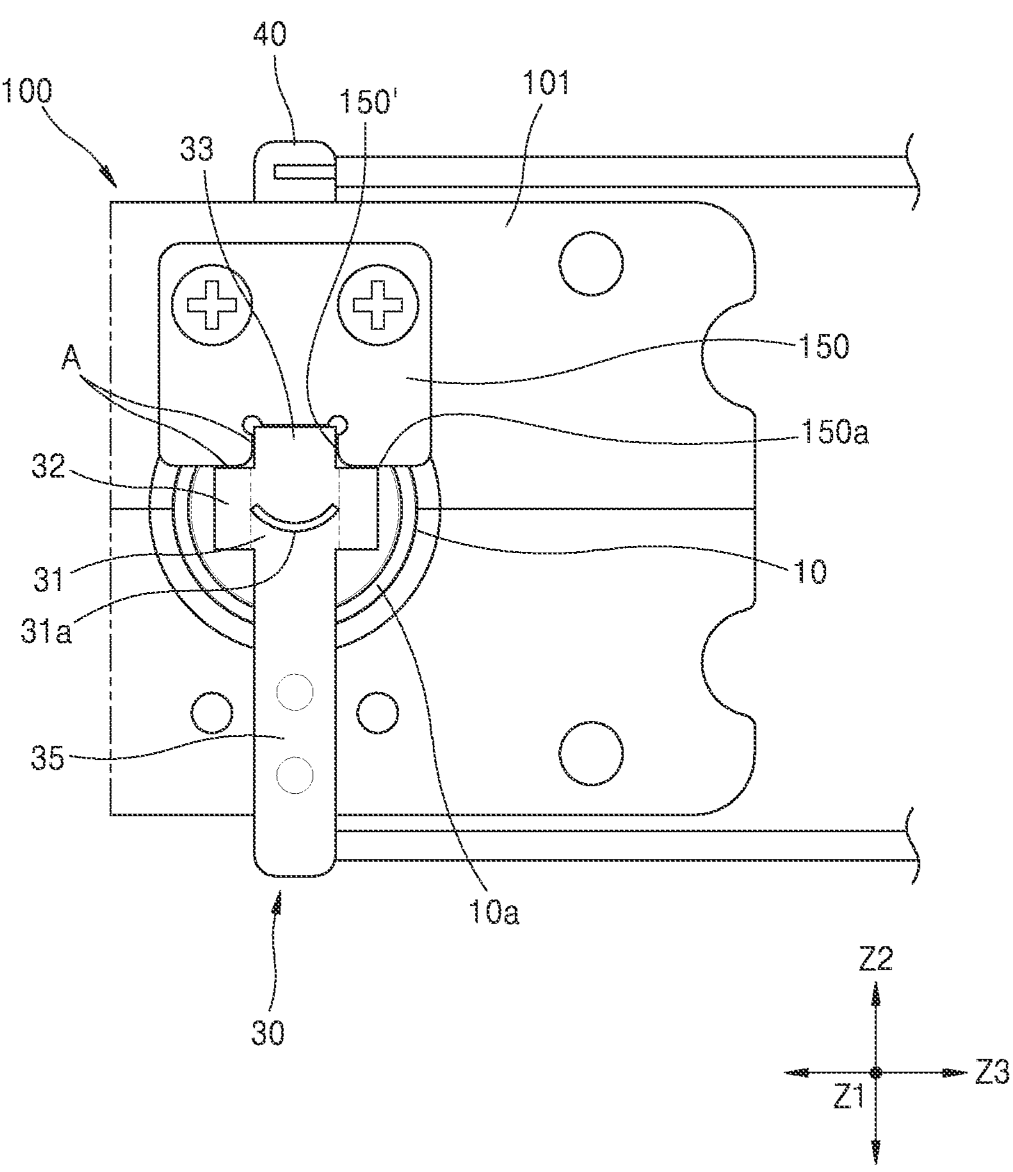
Figure 9:
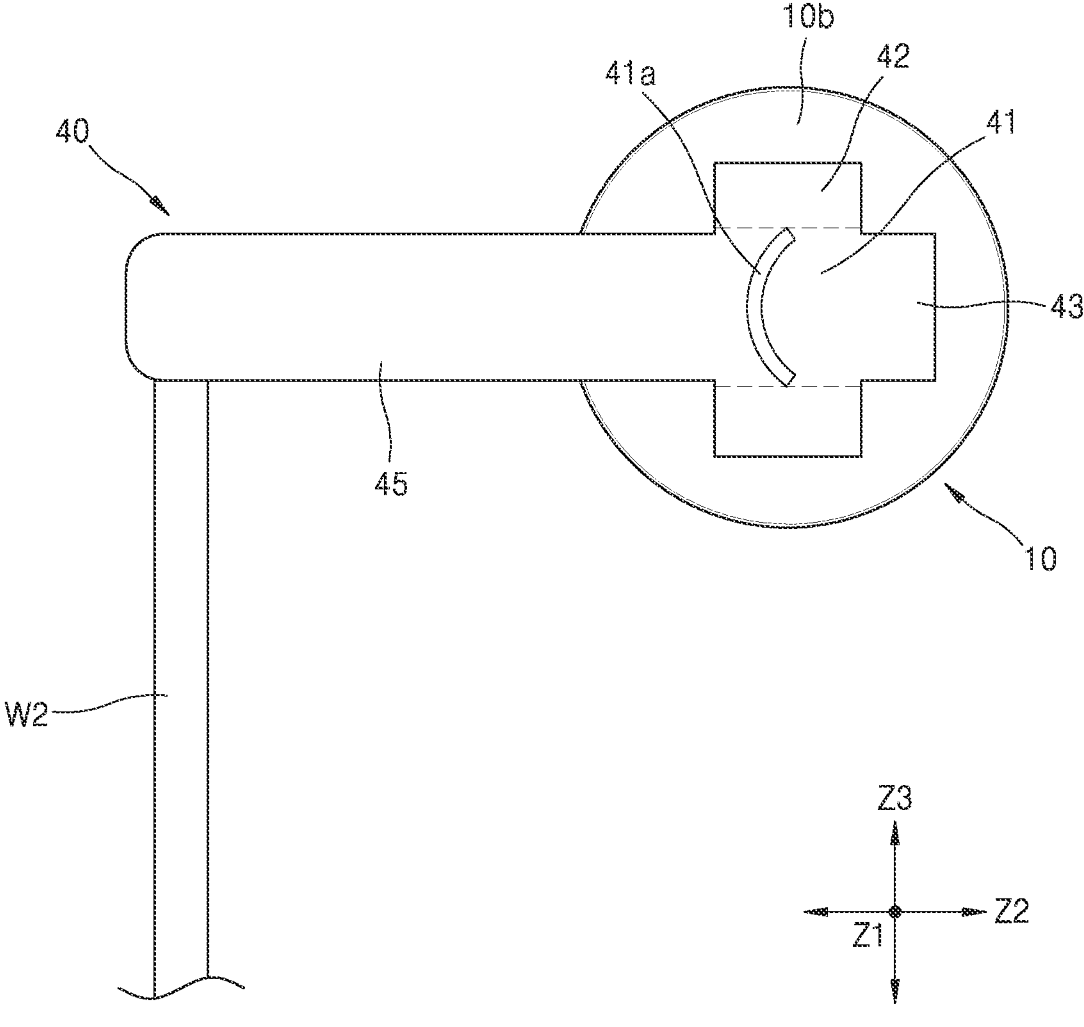
FIG. 9 is a view illustrating a second side of the battery shown in FIG. 1.

FIG. 1 is a perspective view of a battery according to an embodiment of the present disclosure. FIG. 2 is an exploded perspective view of the battery shown in FIG. 1. FIG. 3 is a view illustrating a first side of the battery shown in FIG. 1. FIG. 4 is a perspective view illustrating a stress state acting on a first coupling portion of the battery shown in FIG. 1. FIGS. 5 and 6 are perspective views illustrating a stress state acting on a first coupling portion in comparative examples. FIGS. 7 and 8 are views illustrating temporary fixing of a first electrode tab when a first coupling portion of the battery shown in FIG. 1 is formed. FIG. 9 is a view illustrating a second side of the battery shown in FIG. 1.

Referring to FIGS. 1 to 3, the battery according to an embodiment of the present disclosure may include a cell 10 having first and second surfaces 10*a* and 10*b* that are opposite to each other along a first axis Z1, and a first electrode tab 30 formed on the first surface 10*a* of the cell 10. The first electrode tab 30 includes a first coupling piece 31 including a first coupling portion 31*a* coupled to the first surface 10*a* of the cell 10 and a first lead-out piece 35 extending from the first coupling piece 31 to the outside of (e.g., to outside a periphery of) the cell 10 along a second axis Z2. The first coupling portion 31*a* may have a convex arc shape toward (e.g., convex toward or pointing toward) the first lead-out piece 35.

The first and second surfaces 10*a* and 10*b* may be formed opposite to each other along the first axis Z1, and a side surface 10*c* connects (or extends between) the first surface 10*a* to the second surface 10*b*. For example, the cell 10 according to an embodiment of the present disclosure may have the first and second surfaces 10*a* and 10*b*, and the side surface 10*c* may form a circumferential surface connecting (or extending between) the first surface 10*a* to the second surface 10*b*. In an embodiment of the present disclosure, the first and second surfaces 10*a* and 10*b* may have a circular shape. For example, the cell 10 according to an embodiment of the present disclosure may have a slimmed shape in which a height in a first direction (e.g., a direction of the first axis Z1) is relatively smaller than other dimensions (e.g., a diameter D of the first surface 10*a*). For example, the cell 10 according to an embodiment of the present disclosure may have a slim cylindrical shape with a height H that is less than the diameter D of the first surface 10*a*. For example, the aspect ratio of the diameter D of the first surface 10*a* to the height H of the cell 10 may be in a range of about 5.4:12 to about 5.4:14. In an embodiment of the present disclosure, when the aspect ratio is less than the minimum value of 5.4:12, the height of a cell mounting space of a device configured to use the cell 10 as a power source needs to be that much higher. As a result, the height of the set device may not be reduced below a certain amount. Conversely, when the aspect ratio is greater than the maximum value of 5.4:14, the aspect ratio of an electrode assembly accommodated in the cell 10 may be excessively increased, and according to an increase in the aspect ratio of the electrode assembly, energy efficiency relative to the same volume may be decreased or excessive manufacturing cost may be incurred in forming an electrode assembly having a correspondingly high aspect ratio. Accordingly, in an embodiment of the present disclosure, the aspect ratio of the cell 10, that is, the aspect ratio of the diameter D of the first surface 10*a* to the height H, may be in a range of about 5.4:12 to about 5.4:14.

Referring to FIG. 2, first and second electrodes 11 and 12 having opposite polarities of the cell 10 may be formed on the first and second surfaces 10*a* and 10*b*, respectively. For example, the first electrode 11 may be formed at a middle position of the first surface 10*a*, and the second electrode 12 may be formed from the entire second surface 10*b* to the side surface 10*c* and may extend from the side surface 10*c* to a peripheral position surrounding (e.g., extending around) the middle position of the first surface 10*a*. In an embodiment of the present disclosure, the middle position of the first surface 10*a* may refer to a position including a central portion of the first surface 10*a* or a centrifugal portion of the first surface 10*a* having a circular shape. In addition, the peripheral position of the first surface 10*a* may refer to a position deviated from the central position of the first surface 10*a* or the centrifugal position of the first surface 10*a* having a circular shape. The first electrode 11 and the second electrode 12 may be formed at different positions on the first surface 10*a*. For example, the first electrode 11 may be formed at the middle position of the first surface 10*a*, and the second electrode 12 may be formed at the peripheral position of the first surface 10*a*. In such an embodiment, the first electrode 11 and the second electrode 12 may be spatially spaced apart from each other on the first surface 10*a* and/or may have an insulating member therebetween, and thus, may be electrically insulated from each other.

An insulating cap 20 may cover a portion of the first surface 10*a* of the cell 10, and the insulating cap 20 may allow an electrical connection of the first electrode 11 exposed through a central opening thereof and may provide electrical insulation of the second electrode 12 formed around the first electrode 11. In an embodiment of the present disclosure, the electrical connection of the first electrode 11 may be made through the first surface 10*a* of the cell 10, and the electrical connection of the second electrode 12 may be made through the second surface 10*b* of the cell 10. In such an embodiment, in addition to the first electrode 11 forming an electrical connection through the first surface 10*a* of the cell 10, the second electrode 12 may not be exposed through the first surface 10*a* of the cell 10. The insulating cap 20 may cover a portion of (e.g., a peripheral portion of) the first surface 10*a* so that the second electrode 12 formed at the peripheral position of the first surface 10*a* is not exposed at the first surface 10*a*.

Referring to FIG. 3, the first electrode tab 30 electrically connected to the first electrode 11 may be formed on the first surface 10*a* of the cell 10. The first electrode tab 30 may be coupled to the middle position of the first surface 10*a* of the cell 10 to be electrically connected to the first electrode 11. For example, the first electrode tab 30 may include the first coupling piece 31 coupled to the first electrode 11 and the first lead-out piece 35 extending forward along the second axis Z2 from the first coupling piece 31. The second axis Z2 may refer to a direction crossing (or intersecting) the first axis Z1 and may include one direction and a reverse direction opposite to the one direction along the second axis Z2. In an embodiment of the present disclosure, the second axis Z2 may refer to a direction perpendicular to the first axis Z1. As described below, a third axis Z3 may refer to a direction crossing (or intersecting) the first and second axes Z1 and Z2. For example, the third axis Z3 may refer to a direction perpendicular to the first and second axes Z1 and Z2.

The first lead-out piece 35 may form a charge/discharge path of the cell 10 while extending along the second axis Z2. For example, the first lead-out piece 35 may form a charge/discharge path toward the outside of the cell 10 while extending to the outside of the cell 10 along the second axis Z2 and may extend outside the cell 10 beyond the first surface 10*a* of the cell 10 along the second axis Z2.

The first coupling piece 31 may form an electrical connection with the cell 10 and may be coupled to the first surface 10*a* of the cell 10. The first coupling piece 31 may be formed on the first surface 10*a* and may be arranged entirely on the first surface 10*a* without departing from (e.g., without extending beyond or outside of a periphery of) the first surface 10*a*.

Referring to FIGS. 3 and 4, the first coupling piece 31 may include the first coupling portion 31*a* formed along an arc shape. The first coupling portion 31*a* may include (or may be) a welding line formed by laser welding and/or may include a welding line having an arc shape. In an embodiment of the present disclosure, the first coupling portion 31*a* for forming a coupling between the first coupling piece 31 and the first surface 10*a* may have an arc shape, and in one embodiment, may have a convex arc shape toward (e.g., convex or pointing toward) the first lead-out piece 35. In such an embodiment, that the first coupling portion 31*a* has an arc shape may indicate that the first coupling portion 31*a* does not have a closed shape like a circular shape but has an open arc shape.

As such, the first coupling portion 31*a* having an arc shape may increase bonding strength of the first coupling portion 31*a* in response to (or against) an external impact acting through the first lead-out piece 35 extending to the outside of the cell 10. For example, an external impact that tends to lift the first electrode tab 30, which includes the first lead-out piece 35, from the first surface 10*a* may act on the first lead-out piece 35 extending to the outside of the cell 10 and may cause the first electrode tab 30 to peel off from the first surface 10*a*. The first coupling portion 31*a* having a convex arc shape toward the first lead-out piece 35 may provide an effective resistance to the first electrode tab 30 peeling-off from the first surface 10*a* and may improve the impact resistance of the first electrode tab 30.

The first coupling portion 31*a* having a convex arc shape toward the first lead-out piece 35 may reduce or prevent stress from being concentrated on any one place of the first coupling portion 31*a* while gradually propagating stress from, for example, an external impact from a convex curved portion 31*c* of the first coupling portion 31*a*, which is closest to the first lead-out piece 35, to both ends of the first coupling portion 31*a*, which is farthest from the first lead-out piece 35, in response to an external impact that tends to lift the first electrode tab 30 from the first surface 10*a*. Accordingly, breakage of the first coupling portion 31*a* due to concentration of stress, or peeling-off according thereto, may be mitigated or prevented. For example, in an embodiment of the present disclosure, the first coupling portion 31*a* having an arc shape may easily propagate stress in both directions along the third axis Z3 in response to an external impact that tends to peel off the first electrode tab 30. In an embodiment of the present disclosure, because the first coupling portion 31*a* has a convex arc shape toward the first lead-out piece 35, an external impact acting through the first lead-out piece 35 may act first on the curved portion 31*c* adjacent to the first lead-out piece 35, and stress propagation may occur uniformly in both directions of the first coupling portion 31*a* from the curved portion 31*c* of the first coupling portion 31*a* to the third axis Z3, and the stress propagation may occur toward both ends of the first coupling portion 31*a*.

In a comparative example shown in FIG. 5, which is to be contrasted with embodiments of the present disclosure, a first coupling portion 31*a*' may have a concave shape toward the first lead-out piece 35. In this case, an external impact acting through a first lead-out piece 35 may cause peeling-off, which tends to lift a first electrode tab 30' from a first surface 10*a*, and the external impact may be concentrated on both ends 31*c* of the first coupling portion 31*a*' adjacent to the first lead-out piece 35. In this case, stress propagation may occur in any one direction along the third axis Z3 from the both ends 31*c* of the first coupling portion 31*a*' adjacent to the first lead-out piece 35, but stress propagation may not uniformly occur in both directions along the third axis Z3. For example, the external impact may be concentrated on any one end of the both ends 31*c* adjacent to the first lead-out piece 35. In this case, stress propagation may occur in only one direction along the third axis Z3 from one end of the first coupling portion 31*a*' and may not occur in both directions along the third axis Z3. Because the external impact may act randomly, the external impact may not act symmetrically with respect to the first lead-out piece 35 along the third axis Z3 and may be accompanied by distortion biased toward any one of the ends 31*c* of the first coupling portion 31*a*' along the third axis Z3. In this case, at one end of the first coupling portion 31*a*', which is subjected to relatively intense external impact, stress propagation may not occur in both directions along the third axis Z3 and may occur in only one direction along the third axis Z3. On the other hand, in the embodiment of the present disclosure shown in FIG. 4, even against an external impact acting asymmetrically, for example, an external impact accompanied by distortion, stress propagation may occur in both directions along the third axis Z3 from the curved portion 31*c* of the first coupling portion 31*a* closest to the first lead-out piece 35, and the stress propagation may occur uniformly in both directions along the third axis Z3. In FIG. 5, reference numeral 31' denotes the first coupling piece 31' in which the first coupling portion 31*a*' is formed.

In another comparative example shown in FIG. 6, which is to be contrasted with an embodiment of the present disclosure, a first coupling portion 31*a*" may be formed to have a closed circular (e.g., a circle) shape. The first coupling portion 31*a*" (the comparative example shown in FIG. 6) having a closed circular shape is longer than the first coupling portion 31*a* (the embodiment of the present disclosure shown in FIGS. 1-4) having an open arc shape, and thus, may have a higher bonding strength than the first coupling portion 31*a*. In this case, when the length of the first coupling portion 31*a*" increases, the bonding strength thereof may increase but the manufacturing cost for forming the first coupling portion 31*a*" may increase. With respect to the comparative example including the first coupling portion 31*a*" having a closed circular shape, shown in FIG. 6, and the embodiment of the present disclosure including the first coupling portion 31*a* having an open arc shape, shown in FIG. 4, when comparing the bonding strengths of the first coupling portion 31*a*" and the first coupling portion 31*a*, which have the same length, the first coupling portion 31*a* having an open arc shape may have a relatively high bonding strength. For example, when the first coupling portion 31*a*" having a certain length is formed to have a closed circular shape, the width thereof along the third axis Z3 decreases, but, on the contrary, when the first coupling portion 31*a* having a certain length is formed to have an open arc shape, the width thereof along the third axis Z3 increases. An external impact acting from the first lead-out piece 35 extending to the outside of the cell 10 may be accompanied by distortion, and with respect to an external impact accompanied by distortion in this way, the first coupling portion 31*a*, which has an open arc shape and has a relatively large width along the third axis Z3, may have a higher bonding strength than the first coupling portion 31*a*" of the comparative example. In addition, as in the comparative example shown in FIG. 6, in the first coupling portion 31*a*" having a closed circular shape, a relatively high stress is applied to a semicircular portion 31*a*1" facing the first lead-out piece 35 but a relatively low stress is applied to a semicircular portion 31*a*2" opposite thereto. Because the first coupling portion 31*a*" having a closed circular shape regardless of the orientation with the first lead-out piece 35 is formed with a uniform bonding strength along the first coupling portion 31*a*", the semicircular portion 31*a*2", which overlaps the semicircular portion 31*a*1" facing the first lead-out piece 35 in the direction of propagation of stress due to external impact, may only slightly contribute to the bonding strength relative to a manufacturing cost. In other words, the improvement in strength of bonding relative to the cost may be small.

In the embodiment of the present disclosure shown in FIG. 4, the first coupling portion 31*a* may be formed to have an arc shape and the width thereof along the third axis Z3 may be at least greater than the width of the lead-out piece 35. For example, the width of the first coupling piece 31 in which the first coupling portion 31*a* is formed may be at least greater than the width of the first lead-out piece 35. As described below, the first electrode tab 30 may include, along the second axis Z2, a first coupling piece 31, and a first lead-out piece 35 and a first anti-rotation piece 33 formed on both sides (e.g., opposite sides) of the first coupling piece 31. The width of the first coupling piece 31 along the third axis Z3 may be formed to be greater than those of the first lead-out piece 35 and the first anti-rotation piece 33. When the width of the first coupling portion 31*a* along the third axis Z3 is equal to or less than that of the first lead-out piece 35, an external impact transmitted through the first lead-out piece 35, such as an external impact accompanied by distortion, may intensively act on the positions of both ends of the first coupling portion 31*a* along the third axis Z3. In this case, the external impact that is relatively concentrated on one end position may not propagate (or may not substantially propagate) in both directions along the third axis Z3 from one end position of the first coupling portion 31*a*.

Referring to FIG. 3, a first fixing piece 32 may be formed on both sides (e.g., opposite sides) of the first coupling piece 31. The first fixing piece 32 may extend from both sides of the first coupling piece 31 along the third axis Z3 and may be formed as a pair on both sides of the first coupling piece 31. When the first coupling portion 31*a* for coupling the first electrode tab 30 to the first surface 10*a* of the cell 10 is formed, the first fixing piece 32 may provide a place for temporarily fixing the position of the first electrode tab 30. In an embodiment of the present disclosure, the first coupling portion 31*a* may be formed by welding between the first coupling piece 31 and the cell 10. In such an embodiment, the position of the first coupling piece 31 may be temporarily fixed with respect to the first surface 10*a* of the cell 10 while welding is performed on the first surface 10*a* of the cell 10 and the first coupling piece 31, which overlap each other. For example, referring to FIGS. 7 and 8, in the welding of the first coupling portion 31*a*, the cell 10 may be accommodated in a jig 100 such that the first surface 10*a* is exposed, the first electrode tab 30 may be placed on the first surface 10*a* of the cell 10 exposed from the jig 100, and the position of the first electrode tab 30 with respect to the first surface 10*a* of the cell 10 may be temporarily fixed by pressing the first fixing piece 32 of the first electrode tab 30 against the first surface 10*a* of the cell 10. In addition, by performing welding, for example, laser welding, on the first surface 10*a* of the cell 10 and the first electrode tab 30, which are fixed in position with respect to each other in this way, the first coupling portion 31*a* for coupling the first surface 10*a* of the cell 10 to the first electrode tab 30 may be formed. For example, the first fixing piece 32 may provide a pressing position at both sides of the first coupling piece 31 so that the position of the first coupling piece 31 is fixed on the first surface 10*a* of the cell 10. In addition, by pressing and fixing the first fixing piece 32 on the first surface 10*a* of the cell 10, the first coupling piece 31, between the pair of first fixing pieces 32, may be fixed in position on the first surface 10*a* of the cell 10, and the first coupling portion 31*a* may be formed through (or during) the position fixing therebetween to firmly couple the first coupling piece 31 to the first surface 10*a* of the cell 10.

Referring to FIG. 3, the first fixing piece 32 may be formed as a pair on both sides of the first coupling piece 31 along the third axis Z3. As described above, the first fixing piece 32, formed as a pair on both sides of the first coupling piece 31, may improve the impact resistance of the first electrode tab 30. For example, through the first lead-out piece 35 extending from the first coupling piece 31 to the outside of the cell 10, an external distortion moment with the first lead-out piece 35 as the axis of moment may act on the first coupling piece 31, and the external distortion moment may be transmitted to the first coupling piece 31 along the first lead-out piece 35 to make the first coupling piece 31 deviate from the first surface 10*a* of the cell 10. In this case, the first fixing pieces 32, formed as a pair on both sides of the first coupling piece 31, may provide a resistance moment in the opposite direction to the external distortion moment with the first lead-out piece 35 as the axis of moment. For example, the first fixing piece 32 may provide resistance to an external distortion moment and may improve the impact resistance characteristics of the first electrode tab 30 against an external impact, such as an external distortion moment. Thus, the first fixing piece 32, according to an embodiment of the present disclosure, may fix the position of the first coupling piece 31 when the first coupling portion 31*a* is formed and may also improve the impact resistance characteristics of the first electrode tab 30 by providing effective resistance to an external impact, such as an external distortion moment.

The first lead-out piece 35, which is at a position in front of (e.g., a front position of) the first coupling piece 31 along the second axis Z2 and extends to a position outside the cell 10, may be formed to form a charging and discharging path of the cell 10. The first anti-rotation piece 33 may be formed at a rear position of the first coupling piece 31 along the second axis Z2. For example, the first lead-out piece 35 may extend in one direction of the second axis Z2 from the first coupling piece 31, and the first anti-rotation piece 33 may extend from the first coupling piece 31 in a direction opposite to the one direction of the second axis Z2. The first anti-rotation piece 33 may be formed together with (e.g., may be integral with) the first coupling piece 31 and the first fixing piece 32 at a rear position of the first electrode tab 30 along the second axis Z2, that is, at a rear position of the first electrode tab 30 in which the first coupling piece 31 and the first fixing piece 32 on both sides of the first coupling piece 31 are arranged, and may be formed at the rearmost position of the first electrode tab 30. As described below, the first anti-rotation piece 33 and the first fixing piece 32 may be formed together at (e.g., may be integrally formed at) a rear position of the first electrode tab 30 opposite to the first lead-out piece 35 along the second axis Z2 and may temporarily fix the first electrode tab 30. A position alignment surface A for temporarily fixing the first electrode tab 30 and preventing movement of the first electrode tab 30 may be formed on adjacent side surfaces of the first anti-rotation piece 33 extending along the second axis Z2 from the first coupling piece 31 and of the first fixing piece 32 extending along the third axis Z3 from the first coupling piece 31. This will be described in more detail later.

The first anti-rotation piece 33 may temporarily fix the position of the first electrode tab 30 when the first coupling portion 31*a*, for coupling the first electrode tab 30 to the first surface 10*a* of the cell 10, is formed. In an embodiment of the present disclosure, the first coupling portion 31*a* may be formed through welding between the first coupling piece 31 and the cell 10, and the position of the first coupling piece 31 is temporarily fixed with respect to the first surface 10*a* of the cell 10 during the welding of the first coupling portion 31*a* (e.g., welding on the first surface 10*a* of the cell 10 and the first coupling piece 31, which overlap each other). More specifically, referring to FIGS. 7 and 8, the cell 10 may be accommodated in a jig 100 such that the first surface 10*a* is exposed, and the first electrode tab 30 may be placed on the first surface 10*a* of the cell 10 that is exposed from the jig 100 for the welding of the first coupling portion 31*a*. In addition, because the first electrode tab 30, which is placed on the first surface 10*a* of the cell 10, and a protruding piece 150, which protrudes, toward the first surface 10*a* of the cell 10, from a first surface 101 of the jig 100 adjacent to the first surface 10*a* of the cell 10, are combined with each other, the first electrode tab 30 may be temporarily fixed on the first surface 101 of the jig 100 and the first electrode tab 30 may be temporarily fixed to the cell 10 accommodated in the jig 100.

In an embodiment of the present disclosure, the protruding piece 150 on (e.g., formed on) the first surface 101 of the jig 100 in which the cell 10 is accommodated may protrude toward the first surface 10*a* of the cell 10 that is exposed from the jig 100 and may temporarily fix the position of the first electrode tab 30 while being combined with the first electrode tab 30 placed on the first surface 10*a* of the cell 10.

In an embodiment of the present disclosure, the protruding piece 150 of the jig 100 may be combined with (e.g., may contact or engage with) the first anti-rotation piece 33 of the first electrode tab 30. In some embodiments, an accommodation groove 150', in which the first anti-rotation piece 33 of the first electrode tab 30 is accommodated, may be formed in the protruding piece 150 of the jig 100. In addition, by fitting the first anti-rotation piece 33 in the accommodation groove 150' of the protruding piece 150, arbitrary (or undesired or unintended) rotation of the first anti-rotation piece 33 in the accommodation groove 150' may be prevented. The rotational position of the first electrode tab 30 including the first anti-rotation piece 33 may be temporarily fixed on the first surface 10*a* of the cell 10 by the first anti-rotation piece 33 being constrained within the accommodation groove 150'.

In an embodiment of the present disclosure, the combination between the protruding piece 150 of the jig 100 and the first electrode tab 30 may include the fitting between the accommodation groove 150' of the protruding piece 150 and the first anti-rotation piece 33 of the first electrode tab 30, and a physical interference formed when a side surface 150*a* of the protruding piece 150 outside of the accommodation groove 150' contacts a side surface of the first fixing piece 32 of the first electrode tab 30. For example, the protruding piece 150 and the first electrode tab 30 may be formed (e.g., designed) to be combined with each other (e.g., the protruding piece 150 and the first electrode tab 30 may have corresponding or complimentary structures). Inside the accommodation groove 150' formed in the protruding piece 150, the accommodation groove 150' and the first anti-rotation piece 33 may be combined with each other, and outside of the accommodation groove 150', the side surface 150*a* of the protruding piece 150 and the side surface of the first fixing piece 32 may contact each other and form a physical interference. In this case, the side surface 150*a* of the protruding piece 150 and the side surface of the first fixing piece 32 may contact each other. In various embodiments of the present disclosure, even if the side surface 150*a* of the protruding piece 150 and the side surface of the first fixing piece 32 do not directly contact each other, that is, they face each other but are spaced apart from each other enough such that the first electrode tab 30 may move slightly before contacting the side surface 150*a* of the protruding piece 150, such movement of the first electrode tab 30 may be prevented and the first electrode tab 30 may be temporarily fixed. Therefore, physical interference between the protruding piece 150 and the first fixing piece 32 may refer to direct contact between the protruding piece 150 and the first fixing piece 32 but may also refer to a structure in which the protruding piece 150 and the first fixing piece 32 face each other at a distance from each other and do not directly contact each other.

As described above, the protruding piece 150 of the jig 100 and the first electrode tab 30 may be formed to be combined with each other. Components (e.g., the first anti-rotation piece 33 and the first fixing piece 32) of the first electrode tab 30 to be combined with the protruding piece 150 of the jig 100 may be formed at a position adjacent to the first coupling piece 31 and may be formed together at a rear position of the first electrode tab 30 at which the first coupling piece 31 is formed rather than at a front position of the first electrode tab 30 at which the first lead-out piece 35 is formed along the second axis Z2.

In an embodiment of the present disclosure, the first anti-rotation piece 33 and the first fixing piece 32 may be combined with (e.g., may be accommodated in) the protruding piece 150 of the jig 100 at a rear position of the first electrode tab 30. In such an embodiment, the combination with the protruding piece 150 of the jig 100 may occur when the protruding piece 150 of the jig 100 contacts the position alignment surface A formed on adjacent side surfaces of the first anti-rotation piece 33 extending along the second axis Z2 from the first coupling piece 31 and the first fixing piece 32 extending along the third axis Z3 from the first coupling piece 31. For example, the adjacent side surfaces of the first anti-rotation piece 33 and the first fixing piece 32 may form the position alignment surface A. The position alignment surface A at the first anti-rotation piece 33 may form a physical interference with the accommodation groove 150' formed in the protruding piece 150 of the jig 100, and the position alignment surface A at the first fixing piece 32 may form a physical interference with the side surface 150*a* of the protruding piece 150 of the jig 100. In this example, the physical interference of the first anti-rotation piece 33 and the first fixing piece 32 may refer to direct physical contact with the protruding piece 150 of the jig 100 or may refer to a structure in which the first anti-rotation piece 33 and the first fixing piece 32 face the protruding piece 150 of the jig 100 with a spacing therebetween and not direct contact with the protruding piece 150 of the jig 100.

Referring to FIG. 3, the first anti-rotation piece 33 may temporarily fix the position of the first electrode tab 30 when the first coupling portion 31*a* for coupling the first electrode tab 30 to the first surface 10*a* of the cell 10 is formed and may provide resistance to an external impact that tends to lift the first electrode tab 30 from the first surface 10*a* of the cell 10 even after the first coupling portion 31*a* is formed. For example, in an embodiment of the present disclosure, an external impact that may cause peeling-off of the first electrode tab 30 by lifting the first electrode tab 30 from the first surface 10*a* of the cell 10 may act on the lead-out piece 35, which extends beyond the first surface 10*a* of the cell 10, and the first anti-rotation piece 33 may provide a reverse (or counter) resistance to the external impact. For example, the first anti-rotation piece 33 may be formed at a rear position opposite to the front position of the first lead-out piece 35 extending to the outside of the cell 10 along the second axis Z2 and may be formed at a position opposite to the first lead-out piece 35 with respect to the first coupling piece 31 to provide resistance in a reverse direction to offset the external impact acting on the first lead-out piece 35.

As described above, the first electrode tab 30 arranged on the first surface 10*a* of the cell 10 may include the first lead-out piece 35 extending to the outside of the cell 10 in one direction of the second axis Z2 from the first coupling piece 31 coupled to the first surface 10*a* of the cell 10, the first fixing piece 32 formed at both sides of the first coupling piece 31, and the first anti-rotation piece 33 extending from the first coupling piece 31 in a direction opposite to the direction of the second axis Z2. In an embodiment of the present disclosure, in the first electrode tabs 30, the first lead-out piece 35, the first coupling piece 31, and the first anti-rotation piece 33 may be formed on one line along the second axis Z2. In such an embodiment, the width of the first coupling piece 31 along the third axis Z3 may be greater than the widths of the first lead-out piece 35 and the first anti-rotation piece 33. For example, in an embodiment of the present disclosure, the width of the first coupling piece 31 may refer to a width of a region where the first coupling portion 31*a* is formed along the third axis Z3, and the width of the first fixing piece 32 may refer to a width extending along the third direction Z3 from the width of the first coupling piece 31. In an embodiment of the present disclosure, the width of the first anti-rotation piece 33 may be equal to the width of the first lead-out piece 35 along the third direction Z3. For example, the first coupling portion 31*a* may be formed on the first coupling piece 31, and the width of the first coupling portion 31*a* along the third axis Z3 may be greater than the widths of the first lead-out piece 35 and the first anti-rotation piece 33, and thus, impact resistance to an external impact accompanied by distortion may be improved. In addition, the width of the first lead-out piece 35 and the width of the first anti-rotation piece 33 along the third axis Z3 may be equal to each other.

The first lead-out piece 35 and the first anti-rotation piece 33 may be respectively formed at a front position and a rear position of the first coupling piece 31 with respect to the first coupling piece 31. In addition, the first fixing piece 32 may be arranged at both sides of the first coupling piece 31 along the third axis Z3 cross (or intersecting) the second axis Z2. As such, the first electrode tab 30 may be formed to have an overall cross shape extending along the second axis Z2 and the third axis Z3. In such an embodiment, a position where components along the second and third axes Z2 and Z3 intersect with each other may correspond to the position of the first coupling piece 31 formed at a relatively rear position of the first electrode tab 30 along the second axis Z2. In addition, because the first fixing piece 32 extends along the third axis Z3 from the first coupling piece 31 arranged at a rear position of the first electrode tab 30 along the second axis Z2, the first electrode tab 30 having a cross shape, which extends along the second axis Z2 and the third axis Z3, may be formed.

A first lead wire W1 (see, e.g., FIG. 3) may be connected to the first electrode tab 30. For example, the first lead wire W1 may be connected to an end of the first lead-out piece 35 of the first electrode tab 30. The first lead wire W1 may extend along the third axis Z3 from an end of the first lead-out piece 35 extending along the second axis Z2. For example, the first lead wire W1 may have the form of a wire having a ductility (e.g., a ductile wire), unlike the first electrode tab 30, which includes (or is) a thin metal plate as a whole, to provide convenient connection with an external device.

Referring to FIG. 9, a second electrode tab 40 may be arranged on the second surface 10*b* of the cell 10. The second electrode tab 40 may be formed to have substantially the same shape as the first electrode tab 30. For example, in an embodiment of the present disclosure, the second electrode tab 40 may include a second coupling piece 41 including a second coupling portion 41*a* coupled on a second surface 10*b* of a cell 10, a second lead-out piece 45 extending to the outside of the cell 10 beyond the second surface 10*b* of the cell 10 in one direction of the second axis Z2 from the second coupling piece 41, a second fixing piece 42 extending from the second coupling piece 41 along the third axis Z3 and formed on both sides (e.g., opposite sides) of the second coupling piece 41, and a second anti-rotation piece 43 extending in a direction opposite to the direction of the second axis Z2 from the second coupling piece 41.

In various embodiments of the present disclosure, the first and second electrode tabs 30 and 40 may be formed to have different orientations and/or to have different shapes. For example, the first and second electrode tabs 30 and 40 may be arranged in different orientations on the first and second surfaces 10*a* and 10*b* of the cell 10, respectively, while being formed to have substantially the same shape. For example, the first and second electrode tabs 30 and 40 may be formed to have an overall cross shape while extending in directions crossing (or intersecting) each other and may be arranged in different orientations while being arranged on the first and second surfaces 10*a* and 10*b* of the cell 10, respectively.

In an embodiment of the present disclosure, the second electrode tab 40 may be have substantially the same shape and may be in same orientation as the first electrode tab 30. Technical details of the second coupling piece 41, the second fixing piece 42, the second lead-out piece 45, and the second anti-rotation piece 43 of the second electrode tab 40, and a second lead wire W2 connected to the second electrode tab 40, may be the same as those of the first coupling piece 31, the first fixing piece 32, the first lead-out piece 35, and the first anti-rotation piece 33 of the first electrode tab 30, and the first lead wire W1 connected to the first electrode tab 30, and thus, repeated descriptions thereof will be omitted.

Figure 10:
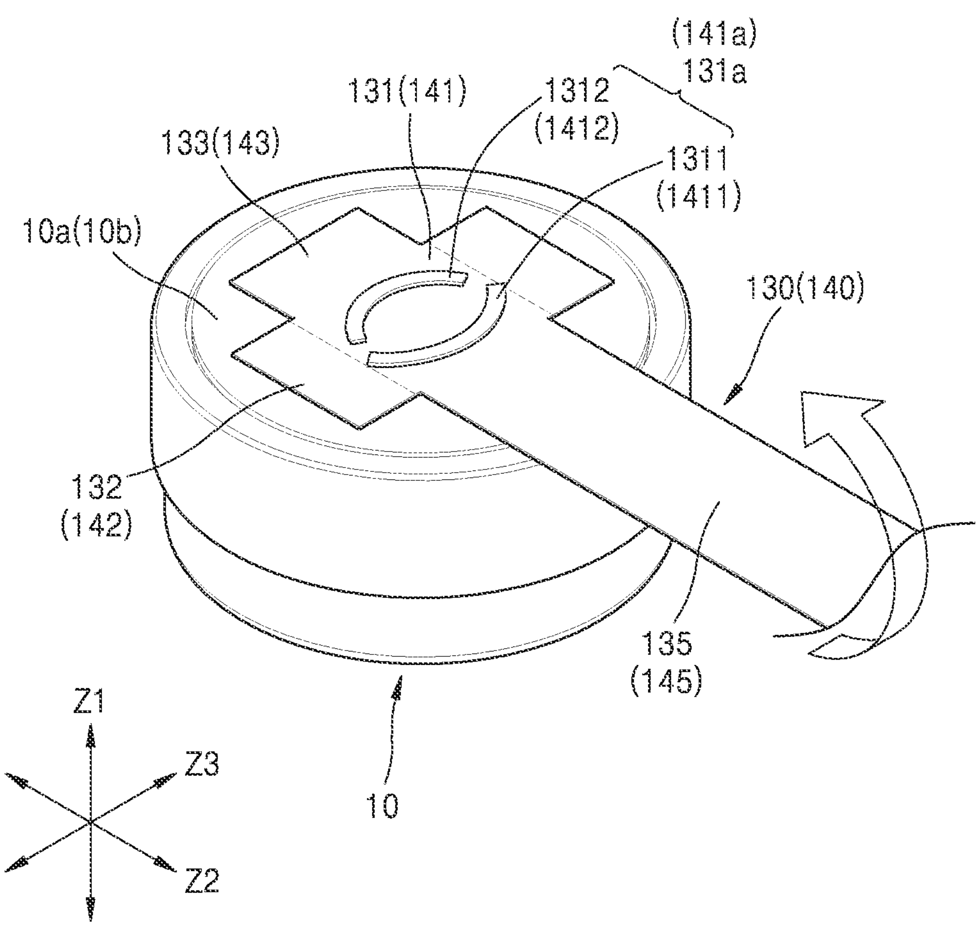
FIG. 10 is a view illustrating a battery according to another embodiment of the present disclosure.

FIG. 10 is a view illustrating a battery according to another embodiment of the present disclosure. The battery may include a cell 10 and a first electrode tab 130 arranged on a first surface 10*a* of the cell 10. The first electrode tab 130 may include a first coupling piece 131 in which a first coupling portion 131*a* coupled to the first surface 10*a* of the cell 10 is formed. In this embodiment, the first coupling portion 131*a* may include a main coupling portion 1311 having a convex arc shape toward a first lead-out piece 135, extending in one direction of a second axis Z2, and an auxiliary coupling portion 1312 having a convex arc shape toward a first anti-rotation piece 133, extending in a direction opposite to the one direction of the second axis Z2. In an embodiment of the present disclosure, the main coupling portion 1311 and the auxiliary coupling portion 1312 may be formed to have convex arc shapes in a direction toward the first lead-out piece 135 and a direction toward the first anti-rotation piece 133, respectively, and may include convex arc-shaped portions directly facing the main coupling portion 1311 and the auxiliary coupling portion 1312, respectively.

To respond to an external impact acting from the first lead-out piece 135 extending to the outside of the cell 10 in one direction of the second axis Z2, the main coupling portion 1311 may disperse stress, caused by the external impact, along an arc shape that is convex toward the first lead-out piece 135, and thus, may prevent the first electrode tab 130 from peeling off from the first surface 10*a* of the cell 10 due to the external impact and may improve the impact resistance of the first electrode tab 130 against the external impact.

To respond to an external impact acting from the first anti-rotation piece 133 extending in a direction opposite to the direction of the second axis Z2, the auxiliary coupling portion 1312 may disperse stress, caused by the external impact, along an arc shape that is convex toward the first anti-rotation piece 133, and thus, may prevent the first electrode tab 130 from peeling off from the first surface 10*a* of the cell 10 due to the external impact and may improve the impact resistance of the first electrode tab 130 against the external impact.

The main coupling portion 1311 and the auxiliary coupling portion 1312 may be formed to have arc shapes convex toward the first lead-out piece 135 and the first anti-rotation piece 133 extending in opposite directions from the first coupling piece 131, respectively, and thus, may improve impact resistance against an external impact acting from the first lead-out piece 135 and the first anti-rotation piece 133. In this way, the main coupling portion 1311 and the auxiliary coupling portion 1312 may be formed to have arc shapes convex toward the first lead-out piece 135 and the first anti-rotation piece 133 formed at positions opposite to the first coupling piece 131, respectively, and thus, may have arc shapes having opposite orientations, respectively. In an embodiment of the present disclosure, the main coupling portion 1311 and the auxiliary coupling portion 1312 may formed to have different lengths. In such an embodiment, that the main coupling portion 1311 and the auxiliary coupling portion 1312 are formed to have different lengths may denote that the total length of the main coupling portion 1311 extending along the arc shape thereof may be different from the total length of the auxiliary coupling portion 1312 extending along the arc shape thereof. As described below, the main coupling portion 1311 and the auxiliary coupling portion 1312 may be formed to respectively have arc shapes having different curvatures. For example, the main coupling portion 1311 may have an arc shape having a first curvature, and the auxiliary coupling portion 1312 may have an arc shape having a second curvature. In such an embodiment, the length of an arc according to the first curvature forming the main coupling portion 1311 may be different from the length of an arc according to the second curvature forming the auxiliary coupling portion 1312, and the length of the arc of the main coupling portion 1311 may be greater than the length of the arc of the auxiliary coupling portion 1312. Because the main coupling portion 1311 receives an external impact acting on the first lead-out piece 135 extending to the outside of the cell 10, the main coupling portion 1311 may be formed to have a length greater than that of the auxiliary coupling portion 1312 for receiving an external impact acting on the first anti-rotation piece 133 arranged inside the cell 10, and the main coupling portion 1311 may provide a relatively higher bonding strength than that provided by the auxiliary coupling portion 1312.

The main coupling portion 1311 and the auxiliary coupling portion 1312 may be formed to have arc shapes according to different curvatures, respectively. For example, the main coupling portion 1311 may have an arc shape according to a first curvature, and the auxiliary coupling portion 1312 may have an arc shape according to a second curvature. In such an embodiment, the first curvature of the main coupling portion 1311 may be less than the second curvature of the auxiliary coupling portion 1312. For example, the main coupling portion 1311 may be formed to be flatter than the auxiliary coupling portion 1312. In other words, the first radius of curvature of the arc shape of the main coupling portion 1311 may be greater than the second radius of curvature of the arc shape of the auxiliary coupling portion 1312. Because the main coupling portion 1311 receives an external impact acting on the first lead-out piece 135 extending to the outside of the cell 10, the main coupling portion 1311 may be formed wider along the third axis Z3 than the auxiliary coupling portion 1312 for receiving an external impact acting on the first anti-rotation piece 133 arranged inside the cell 10. In addition, the main coupling portion 1311 may be formed wider along the third axis Z3 in a relatively flat shape than the auxiliary coupling portion 1312 as the first curvature of the main coupling portion 1311 is less than the second curvature of the auxiliary coupling portion 1312. Accordingly, with respect to an external impact including an external distortion moment, a bonding strength provided by the main coupling portion 1311 may be relatively higher than a bonding strength provided by the auxiliary coupling portion 1312.

In an embodiment of the present disclosure, the width of the main coupling portion 1311 along the third axis Z3 may be greater than the width of the auxiliary coupling portion 1312. For example, the width of the main coupling portion 1311 along the third axis Z3 may be greater than the width of the first lead-out piece 135 or the first anti-rotation piece 133, and the width of the auxiliary coupling portion 1312 along the third axis Z3 may be less than the width of the first lead-out piece 135 or the first anti-rotation piece 133.

A second electrode tab 140 may be arranged on the second surface 10*b* of the cell 10 and may have substantially the same structure as the first electrode tab 130 arranged on the first surface 10*a* of the cell 10. For example, as shown in FIG. 10, a second coupling portion 141*a* coupled to the second surface 10*b* of the cell 10 may include a main coupling portion 1411 and an auxiliary coupling portion 1412 having respective convex arc shapes toward a second lead-out piece 145 and a second anti-rotation piece 143 extending in one direction of the second axis Z2 and a direction opposite to the one direction of the second axis Z2, respectively. The main coupling portion 1411 and the auxiliary coupling portion 1412 may respectively have an arc shape with a first curvature and an arc shape with a second curvature that is different from the first curvature, and the length of the main coupling portion 1411 along the first curvature may be different from the length of the auxiliary coupling portion 1412 along the second curvature. In FIG. 10, a reference numeral 132 and a reference numeral 142 denote a fixing piece formed on the first electrode tab 130 and a fixing piece formed on the second electrode tab 140, respectively.

According to embodiments of the present disclosure, a battery having an electrode tab connected to an electrode of a cell having improved impact resistance characteristics is provided.

According to an embodiment of the present disclosure, because a coupling portion for forming a coupling between a cell and an electrode tab is formed to have a convex arc shape toward a lead-out piece extending from an electrode of the cell forming a charge and discharge path of the cell, the coupling portion may prevent stress from being concentrated on any one place of the coupling portion while gradually propagating stress from to an external impact from a convex curved portion of the coupling portion to both ends of the coupling portion. Accordingly, breakage of the coupling portion due to concentration of stress, or peeling-off according thereto, may be mitigated or prevented.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims and their equivalents.

What is claimed is:

1. A battery comprising:

a cell having a first surface and a second surface opposite to each other along a first axis; and a first electrode tab on the first surface of the cell, the first electrode tab comprising:

a first coupling piece coupled to the first surface of the cell at a first coupling portion;

a first lead-out piece extending from the first coupling piece outside a periphery of the cell along a second axis;

a first fixing piece extending from the first coupling piece toward a nearest periphery of the first surface of the cell along a third axis crossing the second axis; and a first anti-rotation piece extending from the first coupling piece toward a nearest periphery of the first surface of the cell in a direction opposite to extending direction of the first lead-out piece, wherein the first coupling portion has a convex arc shape with the convex face thereof facing toward the first lead-out piece, and wherein the first coupling portion is a welding line, and wherein a width of the first anti-rotation piece along the third axis is smaller than a combined width of the first coupling piece and the first fixing piece along the third axis.

2. The battery of claim 1, wherein the first coupling portion has an open arc shape.

3. The battery of claim 1, wherein a width of the first coupling piece is greater than a width of the first lead-out piece along a third axis crossing the first and second axes.

4. The battery of claim 3, wherein a width, along the third axis, of the convex arc shape first coupling portion is greater than a width of the first lead-out piece.

5. The battery of claim 1, wherein the first fixing piece is a pair at both sides of the first coupling piece along the third axis.

6. The battery of claim 5, wherein the first lead-out piece extends in one direction of the second axis from the first coupling piece.

7. The battery of claim 6, wherein the first lead-out piece and the first anti-rotation piece are respectively at a front position and a rear position opposite to each other along the second axes with respect to the first coupling piece.

8. The battery of claim 6, wherein a position alignment surface is on adjacent side surfaces of the first anti-rotation piece and the first fixing piece.

9. The battery of claim 6, wherein the first coupling portion comprises:

a main coupling portion having a convex arc shape toward the first lead-out piece; and an auxiliary coupling portion having a convex arc shape toward the first anti-rotation piece.

10. The battery of claim 9, wherein a length along the convex arc shape of the main coupling portion is greater than a length along the convex arc shape of the auxiliary coupling portion.

11. The battery of claim 9, wherein the main coupling portion has an arc shape with a first curvature, and wherein the auxiliary coupling portion has an arc shape with a second curvature that is different from the first curvature.

12. The battery of claim 11, wherein the first curvature of the main coupling portion is less than the second curvature of the auxiliary coupling portion.

13. The battery of claim 9, wherein a width of the main coupling portion in a third axis crossing the first and second axes is greater than a width of the first lead-out piece, and wherein a width of the auxiliary coupling portion is less than the width of the first lead-out piece.

14. The battery of claim 6, wherein the first lead-out piece, the first coupling piece, and the first anti-rotation piece, which are sequentially arranged along the second axis, and the first fixing piece have an overall cross shape.

15. The battery of claim 14, wherein, with respect to the first lead-out piece, the first coupling piece, and the first anti-rotation piece, which are sequentially arranged along the second axis, a width of the first coupling piece along the third axis is greater than widths of the first lead-out piece and the first anti-rotation piece.

16. The battery of claim 15, wherein a width, along the third axis, of the convex arc shaped first coupling portion is greater than the widths of the first lead-out piece and the first anti-rotation piece.

17. The battery of claim 1, wherein a first lead wire extending along a third axis crossing the second axis is connected to the first lead-out piece.

18. The battery of claim 1, further comprising a second electrode tab arranged on the second surface of the cell.

19. The battery of claim 18, wherein the second electrode tab comprises:

a second coupling piece comprising a second coupling portion coupled to the second surface of the cell; and a second lead-out piece extending from the second coupling piece to outside a periphery of the cell along the second axis, and wherein the second coupling portion has a convex arc shape toward the second lead-out piece.

* * * * *